(12) United States Patent
Keselman et al.

(10) Patent No.: US 6,758,599 B2
(45) Date of Patent: Jul. 6, 2004

(54) OPTICAL COMMUTATOR

(75) Inventors: Yury Keselman, Beachwood, OH (US); David Jesurun, South Euclid, OH (US)

(73) Assignee: Steris Inc., Temecula, CA (US)

(*) Notice: Subject to any disclaimer, the term of this patent is extended or adjusted under 35 U.S.C. 154(b) by 65 days.

(21) Appl. No.: 10/096,395

(22) Filed: Mar. 12, 2002

(65) Prior Publication Data

US 2002/0126959 A1 Sep. 12, 2002

Related U.S. Application Data (60) Provisional application No. 60/275,058, filed on Mar. 12, 2001.

(51) Int. Cl.[7] ................................................ G02B 6/38
(52) U.S. Cl. .......................... 385/55; 385/60; 385/70; 385/72; 385/78
(58) Field of Search .......................... 385/53, 55, 56, 385/58, 60, 62, 66, 70, 72, 76, 77, 78, 81, 84

(56) References Cited

U.S. PATENT DOCUMENTS

| | | | |
|---|---|---|---|
| 3,912,918 A | 10/1975 | Feinbloom | 362/581 |
| 3,963,323 A | 6/1976 | Arnold | 385/62 |
| 4,101,198 A | 7/1978 | Heldt | 385/81 |
| 4,124,272 A | 11/1978 | Henderson et al. | 385/26 |
| 4,127,319 A | 11/1978 | Forney, Jr. et al. | 385/81 |
| 4,140,365 A | 2/1979 | Burger et al. | 385/72 |
| 4,190,316 A | 2/1980 | Malsby et al. | 385/61 |
| 4,225,214 A | 9/1980 | Hodge et al. | 385/68 |
| 4,240,695 A | 12/1980 | Evans | 385/62 |
| 4,268,115 A | 5/1981 | Slemon et al. | 385/88 |
| 4,279,468 A | 7/1981 | Turley et al. | 385/59 |
| 4,303,300 A | 12/1981 | Pressiat et al. | 385/26 |
| 4,309,071 A | 1/1982 | Prunier | 385/60 |
| 4,676,588 A | 6/1987 | Bowen et al. | 385/62 |
| 4,747,656 A | 5/1988 | Miyahara et al. | 385/75 |
| 4,755,019 A | 7/1988 | Peschko et al. | 385/63 |
| 4,756,595 A | 7/1988 | Braun et al. | 385/75 |
| 4,799,759 A | 1/1989 | Balyasny | 385/66 |
| 4,870,952 A | 10/1989 | Martinez | 362/572 |
| 4,872,736 A | 10/1989 | Myers et al. | 385/60 |
| 4,909,589 A | 3/1990 | Morris | 385/25 |
| 5,039,193 A | 8/1991 | Snow et al. | 385/25 |
| 5,125,056 A | 6/1992 | Hughes et al. | 385/59 |
| 5,337,386 A | 8/1994 | Noll et al. | 385/60 |
| 5,633,963 A | 5/1997 | Rickenbach et al. | 385/25 |
| 5,872,879 A | 2/1999 | Hamm | 385/25 |
| 6,053,639 A | * 4/2000 | Chen | 385/53 |
| 6,152,608 A | 11/2000 | Ghara et al. | 385/60 |
| 6,443,626 B1 | * 9/2002 | Foster | 385/56 |

FOREIGN PATENT DOCUMENTS

DE    2516858 A1    10/1976

* cited by examiner

*Primary Examiner*—Akm Enayet Ullah
*Assistant Examiner*—Kevin S. Wood
(74) *Attorney, Agent, or Firm*—Fay, Sharpe, Fagan, Minnich & McKee, LLP (57) ABSTRACT

An optical coupler includes essentially tubular second connecting piece (40). Second fiber end (14) inserts completely through second connecting piece (40) and is held rigidly such second fiber end (14) is set back from second connecting piece end (78) by a preselected distance. First essentially tubular connecting piece (16) is divided axially into first portion (30) into which first fiber end (12) is inserted and held rigidly, and second portion (32) into which second connecting piece (40) is detachably attached. First and second portions (30, 32) are arranged such that first fiber end (12) is coaxial with and in close proximity to second fiber end (14). Preferably, attachment of second and first connecting pieces (40, 16) includes an axially symmetric groove (46) on an outer surface of second connecting piece (40), and an axially symmetric protrusion (24) on an inner surface of second portion (32) which essentially mates with axially symmetric groove (40).

15 Claims, 4 Drawing Sheets

OPTICAL COMMUTATOR

CROSS-REFERENCE TO RELATED APPLICATION

This application claims the benefit of Application No. 60/275,058 filed Mar. 12, 2001.

BACKGROUND OF THE INVENTION

The present invention relates to the art of illumination devices useful in general lighting applications and, more particularly, relates to an optical commutator useful in specialized fiber optic lighting applications such as, for example, lighting applications which require convenient, efficient, high intensity, small spot size lighting. However, the invention is applicable in any situation where flexible light piping is required, and the incorporated light source may include incandescent, fluorescent, laser, or other light sources.

Electrical lamp apparatus have been in existence at least since the invention of the incandescent light bulb. Many modern electric lamps still utilize incandescent sources essentially similar to the original design but incorporating improved filament materials, better electrical current and voltage control, improved vacuum quality, and other improvements. Other modern lamp apparatus employ fluorescent light sources which typically exhibit higher efficiency and longer service life versus incandescent sources. Specialty lamps are also available which use novel sources such as gas discharge tubes using mercury, sodium, or other gas vapors, xenon arc lamps, gas lasers, semiconductor lasers and light emitting diodes (LED's), and other optical sources.

Beyond the light source, the properties of a lamp system are dictated primarily by the optical path design. In the simplest case, there may be no defined optical path, for example, a ceiling fluorescent tube with no associated optical components other than light diffusers, filters, or the like. More commonly, the omni directional light output is conditioned through the use of parabolic reflectors, flat reflectors, lenses or other refractive elements, diffusers such as lamp shades, spectral filters, apertures, and the like.

In the case of a fixed, immobile lamp, a great deal of engineering freedom exists in the design of the optical path. Optical path design options are significantly restricted, however, in cases where the point of light emission must be mounted on a flexible arm so that the direction or physical location of the light emission is adjustable. An example is the desktop lamp, which in the conventional commercial design includes a flexible arm such as a "gooseneck" flexible arm, multiple-segment multiple-hinged arm, or the like, and a light emitting head which includes an incandescent or fluorescent light source and associated reflectors or other optical components. Other lamp types which may require flexible mounting and therefore typically incorporate the above-described basic design include surgical operating room lamps and lamps for precision mechanical operations such as semiconductor wire bonding, jewelry work, and other fine mechanical tasks.

The requirements for the light emitting head typically include: high brightness, low temperature operation, small spatial size, and low weight. High intensity is required due to the nature of many applications, such as reading and precision jewelry work. Preferably, the lighthead temperature is close to ambient temperature, especially for applications such as desk lighting where the lighthead will be close to a user's face and hands. A small lighthead size is preferable for flexibility in positioning. Low weight is preferable to reduce the mass and cost of the weight-bearing flexible arm.

Conventional lamp designs employing a flexible arm and attached head containing at least the light source require undesirable engineering design compromises between light intensity, thermal temperature, size, and weight. The desired high intensity sources are usually larger and heavier than lower intensity sources. High intensity sources also tend to generate a large amount of heat. The heating problem is especially acute for incandescent sources because these sources tend to be rather inefficient. Replacement of incandescent bulbs by fluorescent tubes may greatly reduce the operating temperature, typically with an accompanying decrease in light intensity which may however be acceptable for certain applications. Improved optics which provide better coupling of the generated light to the area requiring illumination are also beneficial, but the optics may also increase head size and weight.

A different solution to the need for a flexible lighting source has become available with the advent of fiber optics. Using fiber optical transmission permits decoupling of the light source from the point of light emission. A design incorporating fiber optics may include a large, hot, heavy, high intensity light source positioned remotely from a light emitting head. The head is movably located at the point of light emission and is connected to the light source by a fiber optical link. The head need only contain those optical components such as reflectors, lenses, and the like which are necessary to shape the fiber optical output appropriately for the application. Certain optical components, such as spectral filters, may be placed near the light source remote from the head. An additional advantage of incorporating fiber optical transmission is that a single light source may provide optical power for a number of flexibly positioned heads. Such a system could be valuable, for example, in a hospital operating room where the surgical area may preferably be illuminated from two or more different angles to reduce shadowing.

In spite of the benefits potentially available through the incorporation of fiber optics into flexibly positioned lighting systems, practical difficulties have resulted in limited use of fiber optics in such systems. A critical issue is light transmission efficiency at fiber coupling points. Efficient coupling between adjacent fibers requires similar or preferably identical fiber core sizes, smooth fiber end cleaves preferably including anti-reflection coatings, and extremely precise axial and angular alignment of the two fiber tips. For a flexible lamp, the close axial and angular alignment must be maintained as the lamp arm is moved and rotated about the mechanical joints where the fiber coupling typically is employed.

The prior art teaches using standard threaded and snap connectors for connecting fiber optical segments. However, there is a need for a convenient and reliable mechanical configuration for providing a fully rotatable fiber coupling where one fiber end may be rotated freely with respect to the other fiber end while maintaining efficient optical coupling. Such an optical coupling may conveniently be called an "optical commutator" in close analogy to the electrical commutator typically employed in connection of rotor windings in electric motors and generators. An optical commutator having a high light transmission efficiency is a highly desired and critical element for lamp designs in which an arm bearing a fiber-coupled light emitting head is to be freely rotatable about a joint.

It is further desired to provide an optical commutator that finds application well beyond lighting systems. Fiber optics are used increasingly in communications and in various medical applications, among others. The optical commutator is applicable to desired areas identified above as well as others where rotatable coupling of fiber segments may be desirable.

SUMMARY OF THE INVENTION

In accordance with one aspect of the present invention, a rotatable optical fiber coupler for coupling a first fiber with a second fiber is provided. A first hollow radially symmetric connector has a threaded first end and a second end having a plurality of resilient springy fingers extending therefrom in the axial direction, the fingers having extensions directed radially inward. A second hollow radially symmetric connector has a threaded first end, the second connector also having a circumferential groove on the outer surface. The second connector detachably attaches coaxially to the first connector by spring force pressing the finger extensions of the first connector into the groove of the second connector, whereby the second connector may rotate about the coaxial axis relative to the first connector.

A first sleeve is positioned over a length of the first optical fiber and is received into an opening in the threaded end of the first connector, the first sleeve pressing against the first connector and against the first fiber. A second sleeve is positioned over a length of the second optical fiber and is received into the second connector, the second sleeve pressing against the second connector and against the second fiber.

A first bushing securely fits into a space in the second end of the first connector and receives an end of the first fiber after the fiber jacket and a portion of the fiber cladding has been stripped from said end. The first bushing has an inner lip against which the first fiber end presses. A second bushing securely fits into a space in a second end of the second connector and receives an end of the second optical fiber after the fiber jacket and a portion of the fiber cladding has been stripped from said end. The second bushing has an inner lip against which the second fiber end presses.

A first compression fitting is provided to secure the first fiber end to the first connector. The first compression fitting includes a split ferrule ring which fits onto the first sleeve, and a ferrule nut which accepts the split ferrule ring and threads onto the threaded first end of the first connector, whereby the first sleeve distributively compresses against the first fiber end and secures the first fiber end in the first connector.

A second compression fitting is provided to secure the second fiber end to the second connector. The second compression fitting includes an insert with a flange which presses against the second sleeve. A nut accepts the flange of the insert and threads onto the threaded first end of the second connector, whereby the flange compresses against the second sleeve and compressively secures the second fiber end in the second connector In accordance with another aspect of the present invention, an optical commutator for coupling a second fiber end to a first fiber end in a detachable rotatable manner is disclosed. A second connecting piece is essentially tubular in shape. The second fiber end is inserted completely through the second connecting piece and held rigidly therein such that the second fiber end is set back a preselected distance. A first connecting piece is essentially tubular in shape and essentially divided along the axial direction into a first portion into which the first fiber end is inserted and held rigidly, and a second portion into which a portion of the second connecting piece is coaxially detachably inserted and rotatably attached therein. The first portion and the second portion are apportioned such that the first fiber end is coaxial with and in close proximity to the second fiber end whereby light coupling across the fiber ends is obtained.

Preferably, the detachable attachment of the second connecting piece to the first connecting piece second portion includes an axially symmetric groove on an outer surface of the second connecting piece, and an axially symmetric protrusion on an inner surface of the second portion of the first connecting piece which essentially mates with the axially symmetric groove of the second connecting piece.

One advantage of the present invention is that a fully rotatable light-emitting head may remain cool during operation independent of the temperature of the light source.

Another advantage of the present invention is that it decouples the light-emitting head from the light source of a flexibly positioned lighting source.

Another advantage of the present invention is that it permits full rotation of an arm bearing a light-emitting head about any angle, even including angles beyond 0°–360°, i.e. multiple turn rotation.

Another advantage of the present invention is that it provides a rotatable fiber coupling which is easily detachable.

Another advantage of the present invention is that it facilitates a modular lighting system wherein multiple detachable lighting fixtures are available for different applications.

Yet another advantage of the present invention is that it efficiently couples light via fiber optical connection from a light source through a fully, continuously rotatable joint in a lamp arm.

Still further advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

DETAILED DESCRIPTION OF THE PREFERRED EMBODIMENT

With reference to FIGS. 1–5, a preferred embodiment of the invention will be described. The subject rotatable fiber coupler or optical commutator 10 is provided to couple a pair of associated optical fiber ends 12 and 14 in a rotatable manner. A first connector body member 16 has a generally cylindrical shape and is preferably radially symmetric about an axis 17 and hollow. First connector 16 has a threaded end 18, and a second end 20 which includes a plurality of springy fingers 22 extending axially therefrom in a direction opposite from the threaded end. The fingers each have an extension or protrusion 24 directed radially inward. Preferably, a mounting bracket 26 is integrally formed into the first connector body member 16 whereby the first connector may be secured to an associated fixture by mounting holes 28 or the like. It will be recognized that first connector 16 defines a first portion 30 into which the first fiber end is selectively inserted, and a second portion 32 adopted to relatively receive a second connector 40 in a manner to be described below.

Figure 1:
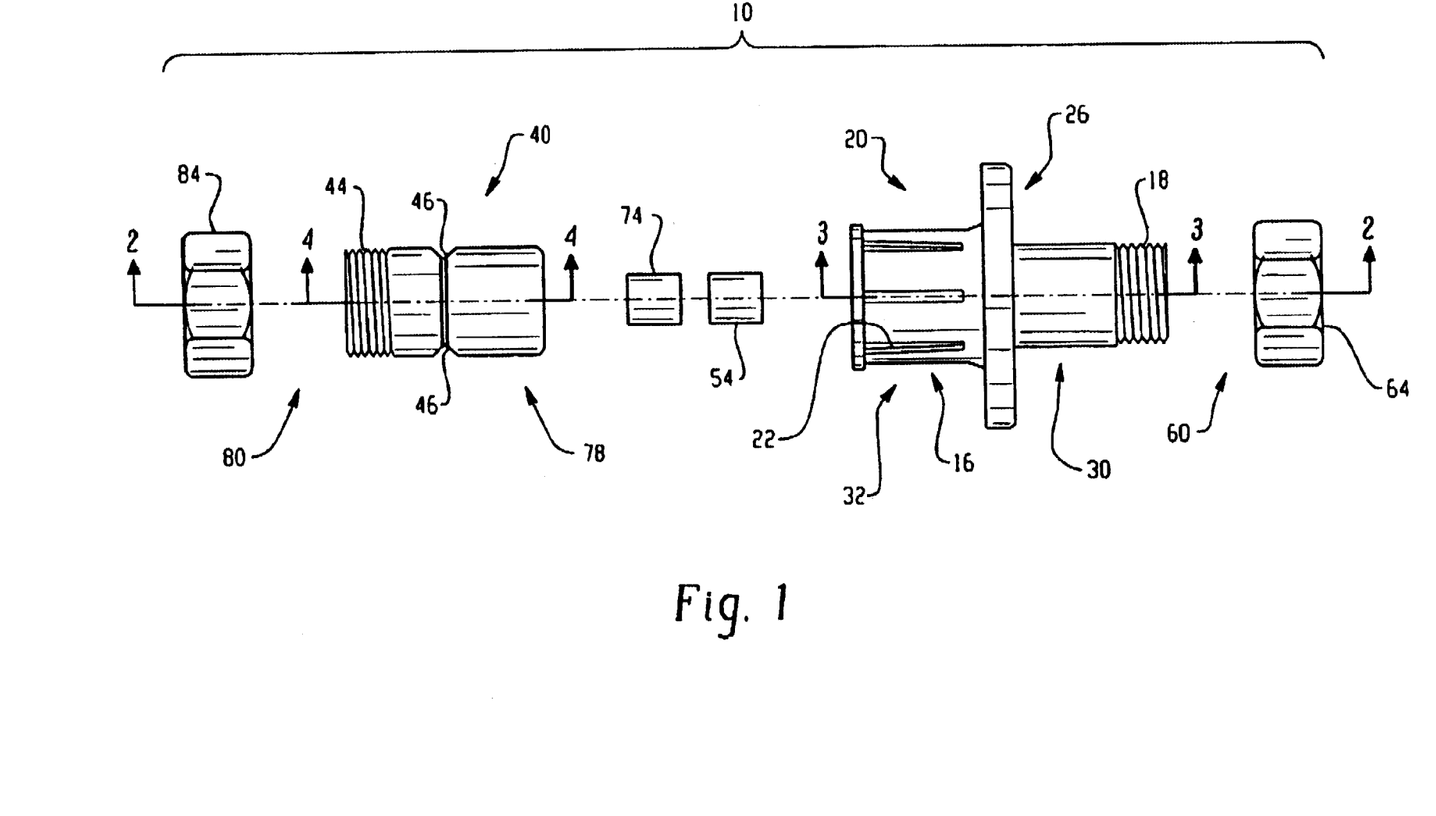
FIG. 1 is an exploded view of the preferred embodiment of the subject optical commutator.
Figure 2:
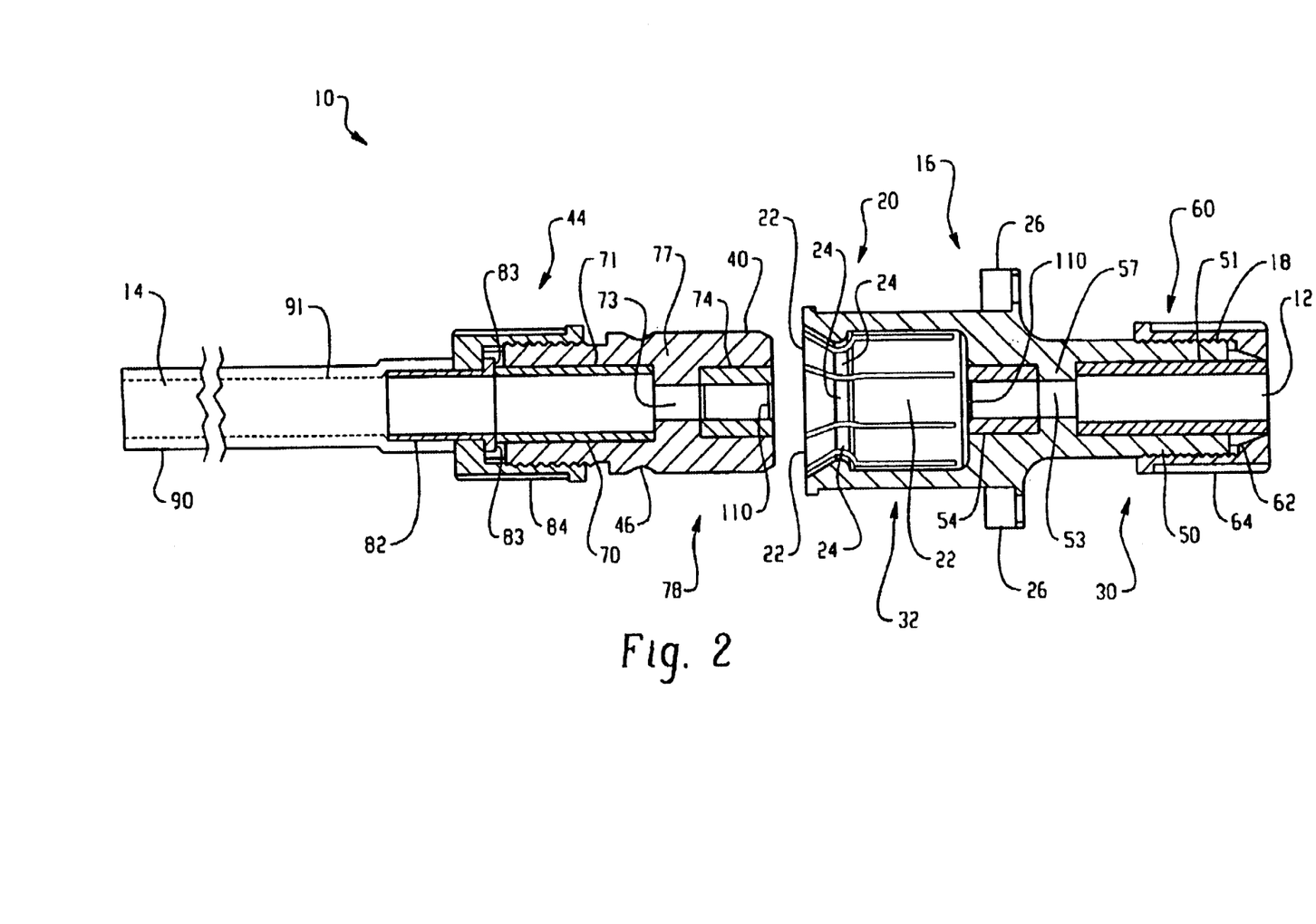
FIG. 2 is a cross-sectional view of the optical commutator of FIG. 1 taken along line 2—2.
Figure 4:
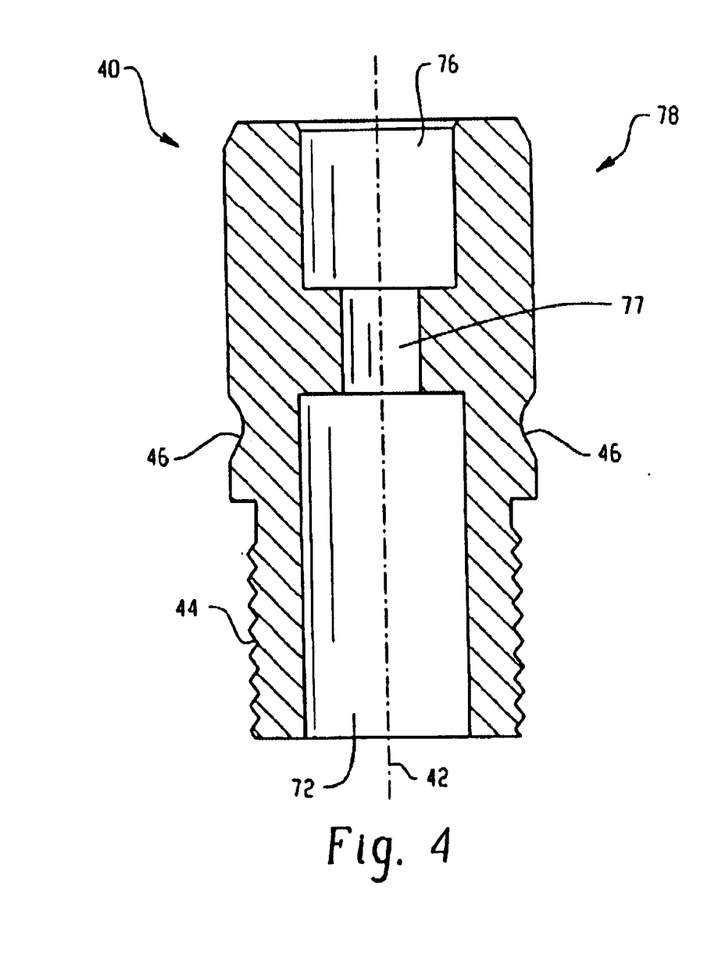
FIG. 4 is a cross-sectional view of the second connector portion of the commutator shown in FIG. 1 taken along line 4—4.

The second connector body member 40 has a generally cylindrical shape and is also preferably hollow and radially symmetric about an axis 42. Second connector 40 includes a threaded end 44 and a radially symmetric circumferential groove 46. Second connector 40 is sized to fit inside the fingers 22 of first connector 16 so that a circumferential groove 46 aligns with finger protrusions 24 whereby the first connector 16 and the second connector 40 are detachably coupled, being held together by spring force pressing the finger extensions or protrusions 24 retained in groove 46. The detachable coupling essentially coaxially aligns the symmetry axes 17 and 42 of the first and second connectors 16, 40 but permits unfettered relative rotational movement of connectors 16, 40 about the coincident axes 17, 42. It will be recognized that although the preferred springy finger-and-groove configuration is illustrated herein for holding the connectors in the coupled relative orientation, many other rotatable interconnects are also contemplated such as replacing the springy fingers 22 with a continuous opening having radially inwardly protruding semi-flexible elements, and other suitable variations or equivalent constructions.

Preferably, the first fiber end 12 is rigidly attached to the first connector 16 and the second fiber end 14 is rigidly attached to the second connector 40. The pair of fiber ends are coaxially oriented and located in precise close proximity when the first and second connectors are brought together and coupled. As a consequence, the relative rotational freedom of connectors 16, 40 provides equivalent relative rotational freedom of the fiber ends 12, 14 in accordance with the desired mechanical operation of the subject optical commutator 10. The connectors 16, 40 are selectively mechanically coupled by cooperative interaction between the resilient springy fingers 22 of first connector 16 and the groove 46 of second connector 40 as described previously. In that way, the fiber ends are selectively optically coupled by the subject optical commutator 10.

Figure 3:
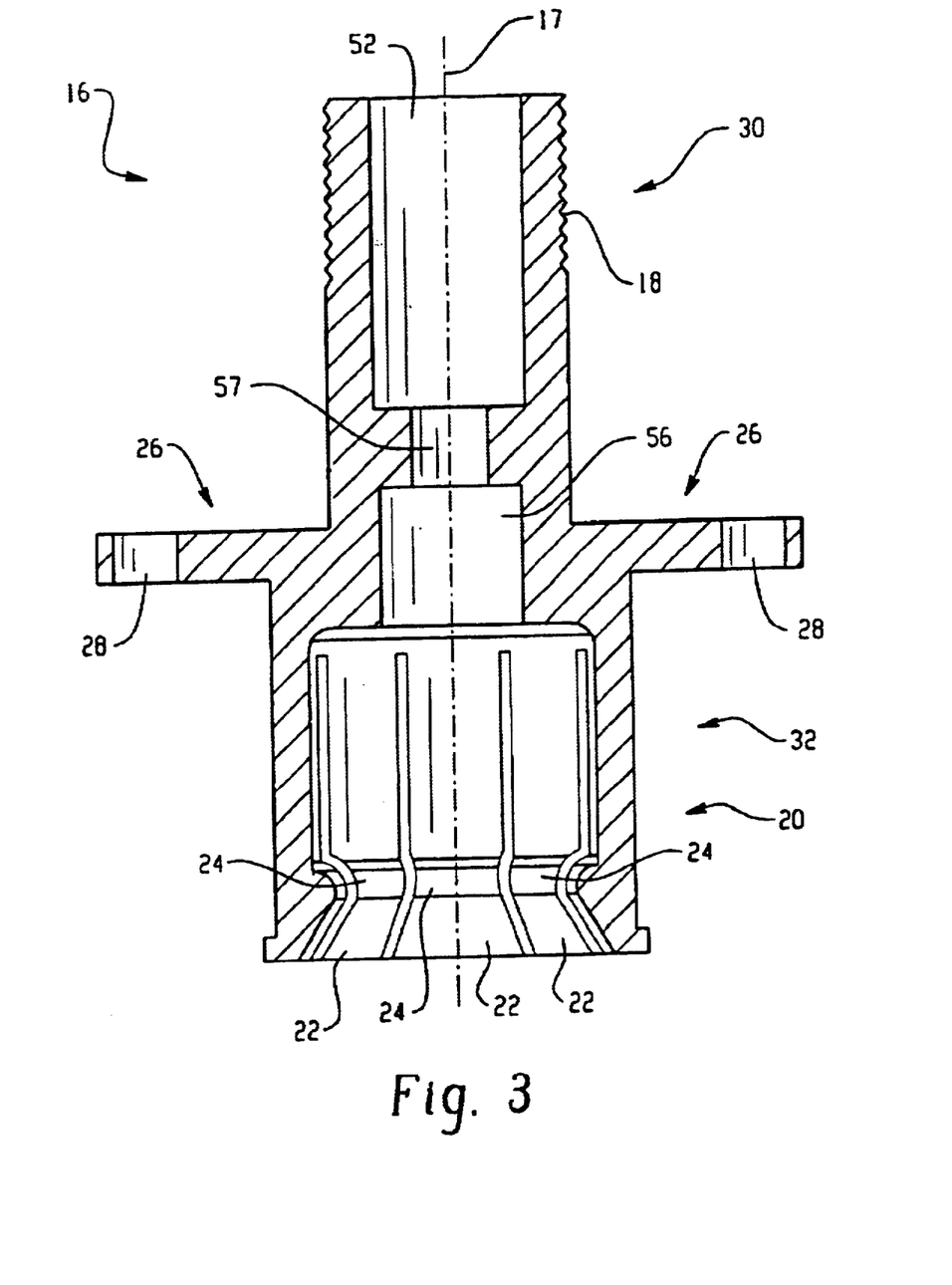
FIG. 3 is a cross-sectional view of the first connector portion of the commutator shown in FIG. 1 taken along line 3—3.

The rigid attachment of first fiber end 12 with first connector 16 is now described with reference to FIGS. 2 and 3. A first sleeve 50 is inserted into an opening 52 at the threaded end 18 of first connector 16. First sleeve 50 does not completely insert, but rather extends slightly beyond the threaded end 18 of first connector 16 when maximally inserted.

Figure 5:
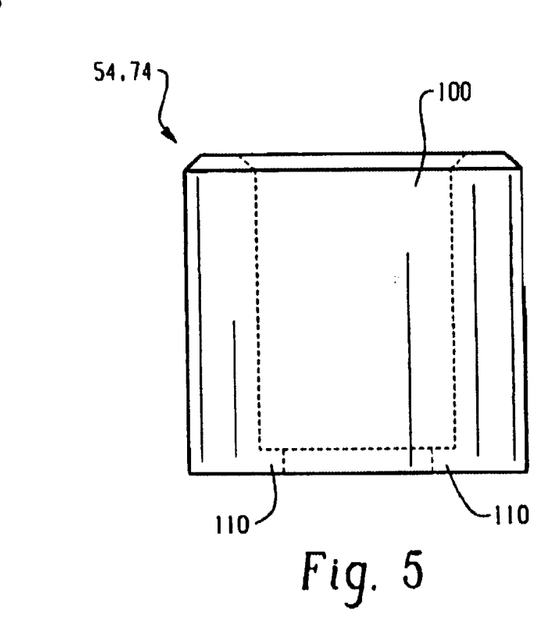
FIG. 5 is a side view of the bushings.

A first bushing 54 is tightly inserted into an opening 56 accessed through second end 20 of first connector 16 and is held in place preferably by friction. As seen in FIG. 5, bushing 54 has an inner opening 100 defining an inside diameter that is preferably essentially the same as the inside diameter of a portion 57 of first connector 16 formed between sleeve opening 52 and bushing opening 56. As shown in FIG. 5, bushing 54 also has an inner lip 110 on one end.

The fiber jacket 51 and a portion of the optical fiber cladding (not shown) is stripped off a portion 53 of first fiber end 12. The stripping preferably removes a portion of the fiber cladding because closer tolerances are realized when the cladding is removed compared with jacket removal. The outer diameter of the stripped section 53 of first fiber end 12 preferably matches the inner diameter of bushing 54, or equivalently matches the inner diameter of portion 57 of first connector 16, so that as first fiber end 12 is slidably inserted into the first connector assembly the stripped portion 53 of first fiber end 12 fits closely within bushing 54 and portion 57 of first connector 16 to obtain precise coaxial alignment of first fiber end 12 relative to first connector axis 17, and also to prevent torsional motion of first fiber end 12. First fiber end 12 preferably presses against inner lip 110 of bushing 54 to precisely define the axial position of the first fiber end 12.

A first compression fitting 60 is provided for locking first fiber end 12 in place within first connector 16. First compression fitting 60 includes a split ferrule ring 62 which fits onto the first sleeve 50, and a ferrule nut 64 which accepts split ferrule ring 62 and threads onto threaded first end 18 of first connector 16. As ferrule nut 64 is tightened, split ferrule ring 62 compresses first sleeve 50 against first fiber end 12. First sleeve 50 thereby distributes the compressive force along an extended length of first fiber end 12. Of course, other suitable fittings may alternatively be employed, such as replacing the split ferrule ring with an insert including a flange which compresses against first sleeve 50.

Turning now to the second connector 40 shown in FIGS. 2 and 4, a second sleeve 70 is inserted into an opening 72 at the threaded end 44 of second connector 40. Second sleeve 70 does not completely insert, but rather extends slightly beyond the threaded end 44 of second connector 40 when maximally inserted.

A second bushing 74 is tightly inserted into an opening 76 at second end 78 of second connector 40 and is preferably held in place by friction. Bushing 74 has essentially the same conformation as bushing 54 used in conjunction with first connector 16, and has an inner opening 100 defining an inside diameter preferably essentially the same as the inside diameter of a portion 77 of second connector 40 lying between sleeve opening 72 and bushing opening 76. As shown in FIG. 5, bushing 74 also has an inner lip 110 on one end.

The fiber jacket 71 and a portion of the optical fiber cladding (not shown) is stripped off a portion 73 of second fiber end 14. The stripping preferably removes a portion of the fiber cladding because closer tolerances are obtainable for cladding removal compared with jacket removal. The outer diameter of the stripped section 73 of second fiber end 14 preferably matches the inner diameter of bushing 74, or equivalently matches the inner diameter of portion 77 of second connector 40, so that as second fiber end 14 is slidably inserted into the second connector assembly the stripped section 73 of second fiber end 14 fits closely within bushing 74 and portion 77 of second connector 40 to obtain precise coaxial alignment of second fiber end 14 with second connector axis 42, and also to prevent torsional motion of second fiber end 14. Second fiber end 14 preferably presses against inner lip 110 of bushing 74 to precisely define the axial position of second fiber end 14 relative to the connector body 40.

A second compression fitting 80 locks second fiber end 14 in place within second connector 40. Second compression fitting 80 includes an insert 82 with a flange 83 which presses against second sleeve 70, and a nut 84 which accepts flange 83 of insert 82 and threads onto threaded first end 44 of second connector 40. Nut 84 drives insert flange 83 against second sleeve 70 as nut 84 threads onto threaded end 44 of second connector 40, and second sleeve 70 is compressively collapsed against second fiber end 14. Second sleeve 70 thereby distributes the compressive force along second fiber end 14. Of course, other suitable fittings may alternatively be employed, such as replacing the insert with a split ferrule ring similar to that used for securing first fiber end 12 within first connector 16.

Preferably, the rigid attachment of second fiber end 14 to second connector 40 includes a third sleeve 90 positioned over a length of the second fiber jacket 91 and extending over a portion of insert 82 to reduce the possibility of fiber damage due to excessive mechanical bending. Although not illustrated here, a similar sleeve may be included for sealing the connection of first fiber end 12 to first connector 16 if the split ferrule ring 62 is replaced by an insert similar to the insert 82 shown for second compression fitting 80.

The subject rotatable optical fiber coupler 10 is preferably manufactured from a lightweight, sturdy material such as a plastic material. In order to provide a precise gap between the fiber ends required for good light coupling across the gap, it was found preferable to use separately manufactured bushings as described above, and these bushings are preferably made from aluminum. However, bushings 54, 74 are contemplated to be manufactured from other materials as well, including plastic. In that regard, bushing 54 may be integrally formed with the first connector 16 and manufactured as a single unitary piece with a sufficiently thin inner lip. Similarly, bushing 74 may be integrally formed with the second connector 40. Inner surfaces of bushings 54, 74 are preferably polished to be highly reflective, especially in the vicinity of the extreme fiber tips where the light coupling across the fiber tips 12, 14 occurs.

Having described the preferred structure of the subject optical commutator 10, the operation of the commutator is now described. For exemplary purposes only, it will be assumed that first fiber end 12 is connected by optical fiber to a stationary light source (not shown) and first connector 16 is rigidly attached by mounting bracket 26 to a wall, ceiling, or other fixed location (not shown). Second connector 40 may then be inserted into first connector 16 by simply pressing second end 78 of second connector 40 into the springy fingers 22 of first connector 16 until the finger extensions 24 engage with groove 46 of the second connector 40. Preferably, fingers 22 are sufficiently stiff to hold second connector 40 in a fixed position in the absence of manual manipulation. By applying manual force, second connector 40 may be rotated about axis 42 without any angular limitations. For all relative rotational angles between first connector 16 and second connector 40, fiber ends 12, 14 remain in precise coaxial alignment defined by the engagement between the connector bodies 16, 40, and in close axial proximity defined essentially by the thicknesses of inner lips 110 of bushings 54, 74. In the present embodiment, inner lip 110 thicknesses are approximately 15 thousandths of an inch for each lip 110. A thicker inner lip 110 typically improves manufacturability but reduces light coupling efficiency due to a correspondingly larger gap. If desired, second connector 40 and its associated arm may be removed by applying a moderate manual force in opposite axial directions to the first and second connectors 16, 40 respectively.

One major advantage of the present invention is that it facilitates a modular lighting system wherein multiple detachable lighting fixtures are available for different applications, each including a fiber coupler terminating in first connector 40. Additionally, a single light source may include several fiber connections each terminating in a first connector 16, and possibly each terminating in a different area of a room or even in different rooms. Any of the detachable lighting fixtures of the modular lighting system may then be attached to any of the several fiber connections of the light source.

Other applications, including applications outside of lighting, are contemplated for the subject commutator. The detachable rotatable optical commutator finds application in laser surgery systems, fiber optical communication systems, and other applications where a versatile and detachable fiber coupling may be desirable.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A rotatable optical fiber coupler for coupling a first fiber with a second fiber, comprising:

a first essentially radially symmetric connector which is essentially hollow and has a threaded first end and a second end having a plurality of springy fingers extending therefrom essentially in the axial direction, the fingers having extensions directed essentially radially inward;

a second essentially radially symmetric connector which is essentially hollow and has a threaded first end, the second connector also having a circumferential groove on the outer surface, the second connector detachably attached coaxially to the first connector by spring force pressing the finger extensions of the first connector into the groove of the second connector, whereby the second connector may rotate about the coaxial axis relative to the first connector;

a first sleeve positioned over a length of the first optical fiber and received into an opening inside the threaded first end of the first connector;

a second sleeve positioned over a length of the second optical fiber and received into an opening inside the threaded first end of the second connector;

a first bushing which securely fits into a space in the second end of the first connector and which receives an end of the first fiber after the fiber jacket and a portion of the fiber cladding is stripped from said end, the first bushing having an inner lip against which the first fiber end presses;

a second bushing which securely fits into a space in a second end of the second connector and which receives an end of the second fiber after the fiber jacket and a portion of the fiber cladding is stripped from said end, the second bushing having an inner lip against which the second fiber end presses;

a first compression fitting including,
a split ferrule ring which fits onto the first sleeve and is compressively held thereto, and
a ferrule nut which accepts the split ferrule ring and threads onto the threaded first end of the first connector, whereby the first connector distributively compresses against the first sleeve and secures the first fiber end in the first connector, and a second compression fitting including, an insert having a flange which presses against the second sleeve, and a nut which accepts the flange of the insert and threads onto the threaded first end of the second connector, whereby the flange compresses against the second sleeve and secures the second fiber end in the second connector.

2. The rotatable optical fiber coupler as set forth in claim 1, further comprising:

a third sleeve positioned over a length of the second optical fiber and extending over a portion of the insert of the second compression fitting.

3. The rotatable optical fiber coupler as set forth in claim 1, wherein the first connector further comprises:

a mounting bracket integrally formed into the first connector whereby the first connector may be secured to an associated fixture.

4. The rotatable optical fiber coupler as set forth in claim 1, wherein:

the first bushing is manufactured from metal; the second bushing is manufactured from metal; and the remaining components are manufactured from plastic.

5. The rotatable optical fiber coupler as set forth in claim 1, wherein:

the first bushing is integrally molded into the first connector;

the second bushing is integrally molded into the second connector; and the first and second connectors are manufactured from plastic.

6. The rotatable optical fiber coupler as set forth in claim 1, wherein:

the detaching of the second connector from the first connector is obtained by applying a moderate manual force in opposite axial directions to the first and second connectors, respectively.

7. The rotatable optical fiber coupler as set forth in claim 1, wherein:

the first connector includes a portion between the first bushing and the first sleeve wherein the inner diameter is essentially similar to the inner diameter of the first bushing; and the second connector includes a portion between the second bushing and the second sleeve wherein the inner diameter is essentially similar to the inner diameter of the second bushing.

8. An optical commutator for coupling a second fiber end to a first fiber end in a detachable rotatable manner, comprising:

a second connecting piece which is essentially tubular in shape and into which the second fiber end is inserted and held rigidly, the second connecting piece including a second circumferential lip on which a tip of the second fiber end is disposed; and a first connecting piece which is essentially tubular in shape and essentially divided along the axial direction into, a first portion into which the first fiber end is inserted and held rigidly, the first portion including a first circumferential lip on which a tip of the first fiber end is disposed, and a second portion into which a portion of the second connecting piece is coaxially detachably inserted and rotatably attached therein, the first portion and the second portion being apportioned such that the first fiber end is coaxial with and in close proximity to the second fiber end, the first and second circumferential lips defining an air gap between the tips of the first and second fiber ends, the first and second fiber ends being optically coupled across the air.

9. The optical commutator as set forth in claim 8 where the detachable attachment of the second connecting piece to the first connecting piece second portion includes:

an axially symmetric groove on an outer surface of the second connecting piece; and an axially symmetric protrusion on an inner surface of the second portion of the first connecting piece which essentially mates with the axially symmetric groove of the second connecting piece.

10. A fiber coupler for operatively coupling a first fiber with a second fiber, comprising:

a first connector body member adapted to receive an end of said first fiber;

a set of resilient fingers on the first connector body member; and, a second connector body member adapted to receive an end of said second fiber, the second connector body member defining a circular groove adapted to receive said set of resilient fingers when the first and second connector body members are in an intermated coupled configuration such that the first and second connector body members are mutually rotatable while said set of resilient fingers are engaged in said circular groove; and a means for keeping the ends of said first and second fibers spaced apart.

11. The fiber coupler according to claim 10 wherein:

the first connector body member defines a first longitudinal axis; and, the second connector body member defines a second longitudinal axis substantially coincident with the first longitudinal axis.

12. The fiber coupler according to claim 11 further including:

a plurality of resilient fingers extending along said first longitudinal axis from said first connector body member, the plurality of resilient fingers having radially inwardly extending extensions adapted to be received in said circular groove on said second connector body member when the first and second connector body members are in said intermated coupled configuration.

13. The fiber coupler according to claim 10 wherein at least one of the first and second connector body members includes a connection portion for connecting the fiber coupler to an associated support member.

14. The fiber coupler according to claim 10 wherein the first and second connector body members are made of plastic.

15. The fiber coupler according to claim 10, wherein the means for keeping the ends of said first and second fibers spaced apart comprises:

a first bushing disposed in the first connector body member, the first bushing receiving the end of the first fiber end; and a second bushing disposed in the second connector body member, the second bushing receiving the end of the second fiber end;

the first and second bushings cooperating to keep the ends of said first and second fibers spaced apart.

* * * * *

United States Patent and Trademark Office
Certificate

Patent No. 6,758,599 B2

Patented: July 6, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yury Keselman, Beachwood, OH; David Jesurun, South Euclid, OH; Victor M. Selig, Broadview Heights, OH.

Signed and Sealed this Twenty-first Day of June 2005.

RODNEY B. BOVERNICK
*Supervisory Patent Examiner*
Art Unit 2874